(12) United States Patent
Arai et al.

(10) Patent No.: US 7,739,703 B2
(45) Date of Patent: Jun. 15, 2010

(54) OPTICAL PICKUP DEVICE AND OPTICAL DISC DRIVE

(75) Inventors: Satoshi Arai, Fujisawa (JP); Hiroaki Furuichi, Kawasaki (JP); Yoshio Oozeki, Yokohama (JP); Rika Nomura, Yokohama (JP); Kazumi Takahashi, Toyokawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 707 days.

(21) Appl. No.: 11/670,047

(22) Filed: Feb. 1, 2007

(65) Prior Publication Data

US 2007/0183273 A1    Aug. 9, 2007

(30) Foreign Application Priority Data

Feb. 3, 2006    (JP)    .............................. 2006-026490

(51) Int. Cl.
*G11B 7/08*    (2006.01)

(52) U.S. Cl. ..................................... 720/671; 369/44.12

(58) Field of Classification Search ................. 720/652, 720/671; 369/44.12, 121, 122
See application file for complete search history.

(56) References Cited

U.S. PATENT DOCUMENTS 6,741,407 B2    5/2004    Fujita et al.
7,286,448 B2 *    10/2007    Suzuki et al.    ............ 369/44.14
7,428,192 B2 *    9/2008    Ochi et al.    ................ 369/44.14
7,454,769 B2 *    11/2008    Ochi et al.    .................... 720/673
7,471,613 B2 *    12/2008    Nabe et al.    .................. 369/122
7,475,412 B2 *    1/2009    Arai et al.    .................... 720/685
7,613,080 B2 *    11/2009    Oozeki et al.    ............ 369/44.14

FOREIGN PATENT DOCUMENTS

| JP | 05-210851 | 8/1993 |
| JP | 2002-342947 | 11/2002 |
| JP | 2004-010758 | 1/2004 |

* cited by examiner

*Primary Examiner*—Angel A. Castro
(74) *Attorney, Agent, or Firm*—Antonelli, Terry, Stout & Kraus, LLP.

(57) ABSTRACT

An optical pickup device having an optical module provided with an optical element and bonded and fixed to an optical pickup case, wherein the optical module is fixed to the optical pickup case by a first ultraviolet curing adhesive at at least two positions with an optical axis between the positions, the optical axis extending from the optical element to the optical pickup case, and at least a part of an exposed surface of the first ultraviolet curing adhesive is covered with a second ultraviolet curing adhesive higher in hardness or elastic modulus than the first ultraviolet curing adhesive to diminish an optical axis offset of the optical pickup device, further, a heat dissipating material higher in thermal conductivity than the first and second ultraviolet curing adhesives is brought into contact with both optical module and optical pickup case to improve the heat dissipating performance of the optical pickup device.

16 Claims, 4 Drawing Sheets

OPTICAL PICKUP DEVICE AND OPTICAL DISC DRIVE

BACKGROUND OF THE INVENTION

The present invention relates to an optical pickup device to be used for writing and reading data to and from an optical recording medium such as a CD (compact disc), a DVD (digital versatile disc), a Blu-ray disc irradiated with a blue color semiconductor laser, or an HD-DVD, as well as an optical disc drive with the optical pickup device installed therein.

In an optical pickup device to be used for writing and reading data to and from an optical recording medium such as a CD, DVD, a Blu-ray disc irradiated with a blue color semiconductor laser, or an HD-DVD, as well as an optical disc drive incorporating such an optical pickup device, light emitted from a light emitting element such as a laser diode is guided to an objective lens through optical parts, including various lenses, prism, mirror and the like and is focused on an optical recording medium, while light returning from the optical recording medium, (e.g., a component reflected by the optical recording medium, which is of the light emitted from the light emitting element), is received by a photodiode through the objective lens and optical parts including various lenses and mirror and is thereby converted into an electrical signal according to the intensity of the light received by the photodiode.

In assembling the optical pickup device, it is necessary that an optical module (light emitting portion) configured a light emitting element such as a laser diode on a sub-mount mounted on a stem and by integrating the sub-mount with a holder formed of metal or resin, or an optical module (detecting portion) configured by integrating a photodiode for receiving an optical signal with holder should be adjusted to an optimum position optically with respect to a case (also designated an optical pickup case) of the optical pickup device, and should be fixed to the case with use of an ultraviolet curing type adhesive. In this regard, it is required that the mounting position of the optical module on the optical pickup device (e.g., the above-described case) be adjusted in a three-dimensional manner in order to absorb (compensate) the "amount of displacement" of the position where any other part than the optical module is mounted on the optical pickup or the tolerance of the said part itself. In order for ultraviolet light to reach a sufficient depth in the direction of the depth of an adhesive portion (an ultraviolet curing type adhesive) which is used for fixing the optical module and the optical pickup case (optical pickup device) to each other, the optical pickup case and the optical module are bonded with a gap of about 200 to 700 μm therebetween. Further, a flexible printed circuit board for the supply of an electric signal is connected to the optical pickup case and the optical module bonded to the optical pickup case through a wide gap so that stress of the flexible printed circuit board is imposed directly on the bonded portion between the optical pickup case and the optical module. Consequently, the bonded portion of the optical module is apt to be dislocated with respect to the optical pickup case.

On the other hand, in the optical pickup device, the highest positional stability is required of the optical module portion. To meet this requirement, an excellent adhesive able to ensure a positional stability of the optical module relative to the optical pickup case generally tends to have high elastic modulus and hardness. However, such an adhesive is disadvantageous in that the adhesive strength thereof just after the bonding is low and that the adhesive strength is apt to be deteriorated in such an external environment as contains humidity. Therefore, in fixing the optical module to the optical pickup case with use of an adhesive, priority is given to the adhesive strength and there is used an adhesive of relatively high elastic modulus and hardness.

In recent years, since optical disc drives are configured to cope with high-speed recording for an optical disc (optical recording medium), an output amount of laser light in an optical pickup device is increased. Consequently, the amount of heat generated from the optical pickup device also increases. Thus, it is now essential to conduct studies to prevent an increase in temperature of the bonded portion between the optical pickup case and the optical module. To solve the above problem, various improvements have been made for the optical pickup case and the optical module with respect to their materials and structures. Above all, as measures which are highly necessary, there has been proposed a method wherein a resin superior in heat conductivity typified by silicone resin is used as a heat dissipating material and is filled into the adhesive-free spatial portion sandwiched in between the optical module and the optical pickup case and also into a space sandwiched in between the optical module and a cover attached to the optical pickup.

In connection with the optical pickup device, Japanese Patent Laid-Open Publication No. Hei 5 (1993)-210851 (hereinafter referred to as Patent Document 1) discloses a structure for fixing by bonding an optical part disposed in an optical path to a holding member, wherein a portion of an adhesive layer, which is exposed to the exterior, is covered with a coating material to prevent a bad influence from exerting on the adhesive layer from the exterior. Japanese Patent Laid-Open Publication No. 2002-342947 (corresponding to U.S. Pat. No. 6,741,407 B2) (Patent Document 2 hereinafter) discloses that a plate (corresponding to an optical module) which carries a photodiode, etc. thereon is fixed temporarily to a housing (corresponding to an optical pickup case) through a small spacing with use of an ultraviolet curing type adhesive, then an appropriate amount of a heat curing type adhesive is poured between cured ultraviolet curing type adhesive portions and is cured by heating, whereby the drawback of the temporary fixing using the ultraviolet curing type adhesive which is highly elastic with a change in temperature is remedied and the mass productivity of the optical pickup is improved. Japanese Patent Laid-Open Publication No. 2004-10758 (Patent Document 3 hereinafter) teaches a structure for mounting an optical element (e.g., a circuit board carrying a light receiving element thereon) for which a high positional accuracy is required to an optical head assembly (e.g., a frame thereof, corresponding to an optical pickup case), wherein the optical element is fixed to the optical head assembly using a highly thixotropic, filler-rich adhesive containing a large amount of filler and, for the purpose of reinforcing a low adhesive strength which is a drawback of the filler-rich adhesive, a filler-lean adhesive of a low viscosity is provided near a bonding interface between the optical element and the optical head assembly. According to this structure disclosed in the Patent Document 3, even if the optical element is fixed by bonding to the frame of the optical head assembly through a gap, there occurs neither peeling nor a lowering of strength of the bonded portion caused by shrinkage stress at the time of curing of the filler-rich adhesive and a high positional accuracy of the optical element relative to the optical head assembly is ensured.

SUMMARY OF THE INVENTION

According to the above conventional techniques, since the heat dissipating material superior in heat conductivity is filled sufficiently between the optical pickup case and the optical module, the heat dissipating characteristic required for the optical pickup device is satisfied. However, since the heat dissipating material is in contact with the whole surface of the ultraviolet curing type adhesive for fixing exclusive of the bonding portion, moisture and volatile component attributable to the heat dissipating material get into the ultraviolet curing adhesive for fixing. As a result, the inventors of the present application discovered the following problem to be caused. That is, as the ultraviolet curing type adhesive for fixing softens and expands, the position of the optical module is deviated with respect to the optical pickup case and the optical axis of the optical module shifts in the optical pickup device.

In the conventional technique disclosed in the Patent Document 1, since the optical part itself is not a heat generating part, it is not necessary to coat the adhesive layer with resin superior in heat dissipating performance.

According to the teaching of the Patent Document 1, the optical part is fixed to the holding member through a very thin adhesive layer low in both elastic modulus and hardness. However, the possibility that the fixed position of the optical part relative to the holding member may be deviated by a curing shrinkage force developed at the time of curing of the coating resin is neither considered nor suggested. Further, when the resin is fed in a sheet shape to the adhesive layer (exposed surface), it is impossible to ensure a satisfactory adhesion of the resin to the adhesive layer, optical part and holding member, which may cause a consequent possibility that the adhesive layer is influenced by the external environment.

According to the conventional technique disclosed in the Patent Document 2, with both an ultraviolet curing adhesive and a thermosetting adhesive, the elasticity with respect to a temperature of the bonded portion formed between the plate and the housing can be diminished after curing of the thermosetting adhesive (thermosetting resin), but the ultraviolet curing adhesive used for the temporary fixing is softened by heat generated at the time of curing of the thermosetting resin and so there is no denying the possibility that the position of the plate relative to the housing may be deviated. Besides, when mounting a laser diode on the plate of the optical pickup taught in the Patent Document 2, an increase in the amount of heat generated with an increase in output of the laser diode is unavoidable, thus requiring improvement in heat dissipating performance of the plate (optical module portion).

According to the conventional technique disclosed in the Patent Document 3, a filler-poor adhesive for reinforcing the adhesive strength is applied to a portion near the bonding interface using a filler-rich adhesive between the optical element (circuit board, corresponding to an optical module) and the frame (corresponding to an optical pickup case) of the optical head assembly, whereby at the time of curing of the filler-rich adhesive the adhesive strength is reinforced with little deviation in relative position of the two because of the filler-poor adhesive. However, the bonded structure disclosed in the Patent Document 3 is influenced by the external environment in a long period of time and therefore it is necessary to ensure a positional stability of the optical element relative to the optical head assembly and thereby improve the reliability thereof. Moreover, like the bonded structure taught in the Patent Document 2, the adhesive structure taught in the Patent Document 3 also involves the problem that it is impossible to achieve a satisfactory heat dissipating performance of the optical element (optical module).

It is an object of the present invention to provide an optical pickup device having an optical module fixed to an optical pickup case through an adhesive layer, wherein even in a state of stress being imposed on the adhesive layer due to for example a flexible printed circuit board connected to the optical module, an offset of an optical axis induced between the optical module and the optical pickup case (a body of the optical pickup device) due to a long-term deformation of the adhesive layer is diminished and the heat dissipating performance of the optical module is ensured, thereby improving the reliability of the optical pickup device.

According to the present invention, in order to achieve the above-mentioned object, in an optical pickup device comprising at least one optical module having an optical element such as a light emitting element and a pickup case with the optical module fixed thereto by bonding through a gap, (1) the optical module is fixed to the pickup case by a first ultraviolet curing adhesive at at least two positions with an optical axis (e.g., an optical axis of the light emitting element) interposed therebetween, the optical axis extending (imaginarily) from the optical element to the pickup case, and (2) at least a part of a surface (contacting neither the optical module nor the pickup case) of the first ultrasonic curing adhesive exposed between the optical module and the pickup case is covered with a second ultraviolet curing adhesive different from the first ultraviolet curing adhesive.

In the optical pickup device thus constructed according to the present invention, (3) the second ultraviolet curing adhesive exhibits a hardness higher than that of the first ultraviolet curing adhesive or exhibits an elastic modulus higher than that of the first ultraviolet curing adhesive.

The structure of the optical pickup device characterized as above according to the present invention is described with the following details.

Detail 1: A heat dissipating material higher in thermal conductivity than those of the first and second ultraviolet curing adhesives is provided so as to be in contact with both the optical module and the optical pickup case.

Detail 2: In the detail 1, the heat dissipating material is formed at at least a part of a space formed so as to be lain between the optical module and the optical pickup case, and the first and the second ultraviolet curing adhesive are not formed (existed) at the part of the space.

Detail 3: The optical module has a first surface (mounting surface) opposed to the optical pickup case and intersecting the aforesaid optical axis, and the first and second ultraviolet curing adhesives are in contact with the first surface and a surface (side wall) opposed thereto of the optical pickup case. Hereby, bonding surfaces are specified.

Detail 4: In the detail 3, the first ultraviolet curing adhesive is in contact with a portion spaced away from an end of the first surface of the optical module.

Detail 5: In the detail 3, the second ultraviolet curing adhesive covers a surface of the first ultraviolet curing adhesive exposed toward an end of the first surface.

Detail 6: In the detail 3, the optical module has at least one second surface, the second surface being in contact at one side thereof with the first surface and spreading in a direction intersecting with the first surface, and a heat dissipating material higher in thermal conductivity than the first and second ultraviolet curing agents is provided at at least a part of a space formed between the second surface and a surface (side wall, cover) opposed thereto of the optical pickup case, the heat dissipating material being provided so as to be in contact with both the second surface of the optical module and the surface opposed thereto of the optical pickup case.

Detail 7: In the detail 3, a terminal of the optical element is provided on a surface different from the first surface of the optical module, and a flexible printed circuit board having one end connected electrically to the terminal is drawn out from the optical pickup case (including a cover as the case may be).

Detail 8: The second ultraviolet curing adhesive has a glass transition temperature higher than that of the first ultraviolet curing adhesive.

Detail 9: The second ultraviolet curing adhesive contains a larger amount of filler than in the first ultraviolet curing adhesive.

Detail 10: In any one of the details 1, 2 and 6, a room temperature curing resin adapted to cure in the presence of moisture contained in air is used as the heat dissipating material.

Detail 11: The optical pickup device having the above structure or the structure with the details is installed into an optical disc drive.

According to the present invention, as set forth above, the heat dissipating performance of the optical pickup device (especially the optical module) is ensured and, even if the optical module bonding portion (adhesive layer) is formed with a thickness apt to undergo stress induced by a flexible printed circuit board or the like connected to the optical module, an optical axis offset which occurs between the optical module and the optical pickup case due to a long-term deformation of the bonding portion is reduced. Since the influence of the external environment on the bonding portion of the optical module can be greatly diminished, it becomes possible to not only diminish such long-term deformation of the bonding portion of the optical module but also suppress a lowering of the strength of adhesion by the bonding portion between the optical module and the optical pickup case. Further, from the standpoint of both adhesive strength and positional stability of the optical module relative to the optical pickup case (optical pickup device body), the structure of mounting the optical module to the optical pickup case according to the present invention contributes greatly to the improvement in long-term reliability of the optical pickup device itself.

DETAILED DESCRIPTION OF PREFERRED EMBODIMENTS

Embodiments of the optical pickup device according to the present invention will be described below with reference to the drawings.

Figure 5A:
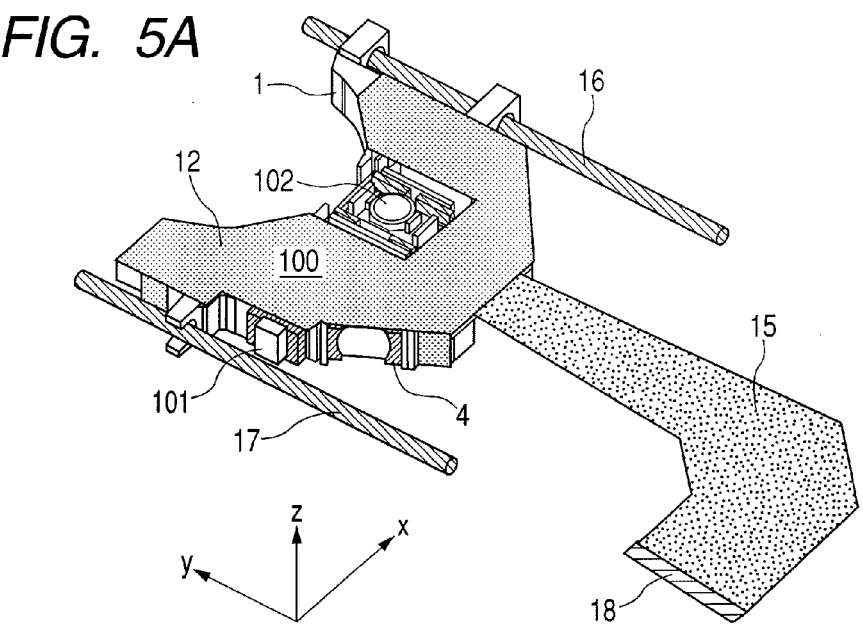
FIG. 5 is a perspective view to explain roughly one embodiment of an optical pickup device to which the present invention is applied.
Figure 5B:
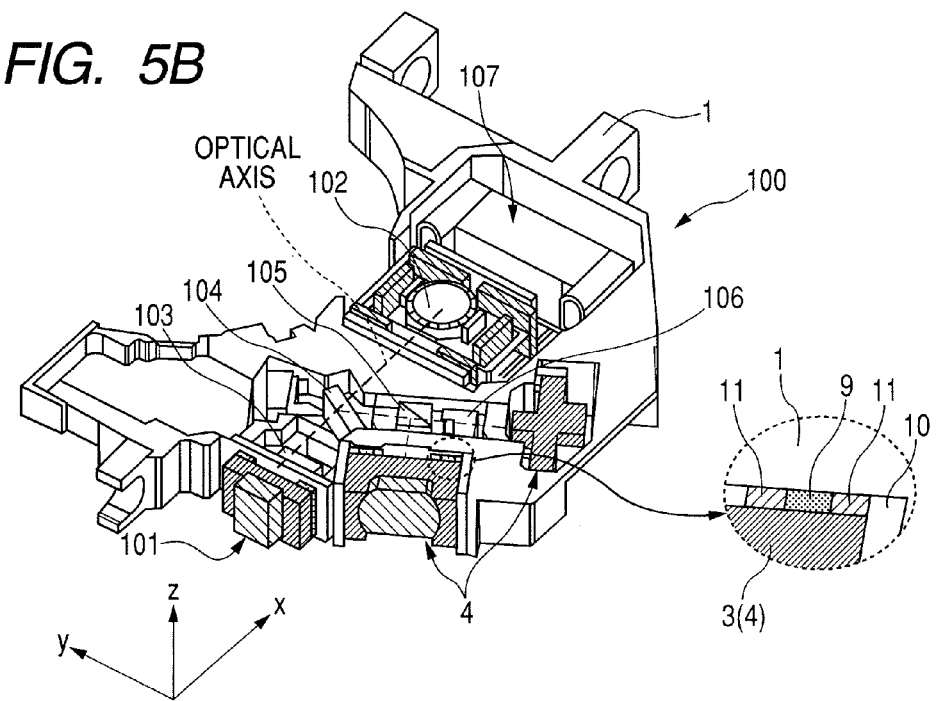

FIGS. 5A and 5B are perspective views for schematically explaining an example of an optical pickup device to which the present invention is applied. FIG. 5A illustrates briefly a structural feature of an optical disc drive apparatus (e.g., CD player or DVD player) in which the optical pickup device, indicated at 100, is installed and FIG. 5B illustrates the details of the optical pickup device 100 itself shown in FIG. 5A.

In FIG. 5A, there is shown an x-y-z coordinate system for explaining operations and layout in the optical disc drive for the optical pickup device 100. It is not necessary that the x, y and z axes in this coordinate system be orthogonal to one another insofar as they intersect one another. In FIG. 5A, a main shaft 16 and a sub-shaft 17 arranged side by side in x-axis direction at both ends of the optical pickup device 100 guide reciprocation in y-axis direction of the optical pickup device 100. That is, although the details of the optical disc drive are not shown in FIG. 5A, a rotational center of an optical disc (optical recording medium) (not shown) is positioned at one end of the y axis. Thus, the y axis represents a radial direction of the optical disc and the optical pickup device 100 moves in the radial direction of the optical disc while being guided by both main shaft 16 and sub-shaft 17 and reads information from a desired track or writes information to that track. On the other hand, the z axis represents a thickness direction of the optical pickup device 100 and a cover 12 is attached to one end (upper surface) in z-axis direction of an optical pickup case 1 with its components on board. In other words, the illustrated optical pickup case 1 and the cover 12 are combined to constitute an optical pickup case in a broad sense.

In FIG. 5A, an optical module (light emitting portion) 4, flexible printed circuit board 15, optical module (detecting portion) 101 and objective lens 102, as main components of the optical pickup device 100, are exposed from the optical pickup case 1 and the cover 12 which covers the upper surface of the optical pickup case 1. The read of information from the optical disc is performed in the following manner. The optical disc (not shown) disposed above the optical pickup device 100 is irradiated with light, the light being emitted from a light emitting element (e.g., a semiconductor laser to be described later) provided in the each optical module (light emitting portions) 4 and condensed by the objective lens 102, then a component (return light) of the light reflected by the optical disc is received by the objective lens 102 and is detected by a light receiving element (e.g., photodiode) provided in the optical module (detecting portion 101), which in turn converts the light into an electric signal (read signal). These information read operations are completed by the following: a control signal is transmitted from a so-called drive circuit (not shown) in the optical disc drive to the optical pickup device 100 through the flexible printed circuit board 15 and the aforesaid read signal is transmitted from the optical pickup device 100 (optical module (detecting portion) 101) to the drive circuit through the flexible printed circuit board 15. A connector inserting portion (drive-side connector inserting portion) 18 having a terminal to be inserted into a connector of the drive circuit is formed at one end of the flexible printed circuit board 15, while an opposite end of the flexible printed circuit board 15 is connected to an electronic circuit (not shown) mounted on the optical pickup case and the optical modules 4 and 101. Write of information to the optical disc is also performed by transmitting a control signal and a write signal from the drive circuit to the optical pickup device 100 through the flexible printed circuit board 15.

FIG. 5B shows in detail an example of the optical pickup device 100 in a state in which the cover 12 and the flexible printed circuit board 15 are removed from the optical pickup device 100 shown in FIG. 5A and so are the main shaft 16 and the sub-shaft 17 for guiding the reciprocation of the optical pickup device. As shown in FIG. 5B, two optical modules (light emitting portions) 4 are mounted on the optical pickup device 100 and light beams emitted from light emitting elements mounted respectively on the optical modules 4 are different in wavelength from each other. An "optical axis" extending from the optical modules 4 to the optical pickup case 1 characterizes the mounting structure of the optical modules 4 for the optical pickup case 1 according to the present invention and extends to the optical pickup case 1 from light output portions of the light emitting elements provided respectively in the optical modules 4.

FIG. 5B shows an optical axis different from the above "optical axis". More specifically, in the optical pickup device 100 illustrated in FIGS. 5A and 5B, the optical disc (not shown) is irradiated through the objective lens 102 opposed thereto with light beams emitted from the two optical modules 4 and return light beams from the optical disc are received by the objective lens 102 and guided to the optical module (detecting portion) 101. Therefore, a beam splitter 104 and a prism 105 for branching optical paths which reach the optical modules 4 and 101 from the objective lens 102 are provided between the objective lens 102 and the optical modules 4, 101. An optical path extending from one of the optical modules 4 to the objective lens 102 is bent in an extending direction of another optical axis which extends in an output direction of the beam splitter 104 from the extending direction of the above "optical axis". An optical path extending from the other optical module 4 to the objective lens 102 is bent in an extending direction of another optical axis which extends in an output direction of the prism 105 from the extending direction of the above "optical axis" and is further bent in the extending direction of the aforesaid another optical axis extending in the output direction of the beam splitter 104. An optical path extending from the optical module 101 to the objective lens 102 extends in the extending direction of the above "optical axis" without being bent by any other optical element. The "optical axis" which characterizes the present invention as described above and the other optical axis are both indicated as broken lines extending on x-y plane in FIG. 5B. To be more exact, the optical axis extending on x-y plane and reaching the objective lens 102 is bent in z-axis direction by the objective lens 102.

In FIG. 5B, a detection lens 103 is disposed between the optical module 101 and the beam splitter 104 and a supplementary lens 106 is disposed between the one of the optical modules 4 and the prism 105. The optical elements 102 to 106 are disposed within the x-y plane (a plane intersecting the thickness direction of the optical pickup device 100) together with the two optical modules (light emitting portions) 4 and the optical module (detecting portion 101). A three-dimensional actuator 107 and the foregoing electronic circuit (connected to the other end of the flexible printed circuit board 15, not shown) are also mounted on the optical pickup case 1.

As shown in FIG. 5B, the appearance of each optical module 4 which will be described later with reference to FIGS. 1A to 4 is shown as a solid body having plural surfaces including a surface (comprising a plane or a curved surface, hereinafter referred to as "fixing surface" for convenience) which is bonded to the optical pickup case 1. At least the fixing surface is opposed to a side wall of the optical pickup case 1. Taking the adhesiveness of each optical module 4 to the optical pickup case 1 into account, it is preferable to form the optical module so that the appearance thereof is in the shape of a polyhedron (e.g., rectangular parallelepiped or cube) including the above fixing surface. It is preferable that the fixing surface be a flat surface. The fixing surface of the optical module 4 is shown on an enlarged scale within a circle as shown in FIG. 5B and the appearance of the fixing surface is defined by a semiconductor laser holding member 3. The fixing surface is formed as a plane intersecting with the foregoing x-y plane. A layer of a first ultraviolet curing adhesive 9 and a layer of a second ultraviolet curing adhesive 11, which will be described later, are formed between the fixing surface and the side wall of the optical pickup case 1 opposed thereto. A space between another surface in contact with (adjacent to) the fixing surface of the optical module 4 and a side wall (another portion) of the optical pickup case 1 opposed thereto is filled with a heat dissipating material 10 to be described later. For the optical module (detecting portion) 101, it is preferable to have an appearance conforming to that of the optical module 4 and be fixed to the optical pickup case 1 as is the case with the optical module 4.

The following description is now provided about technical matters common to the optical pickup case 1, optical modules 4 and their adhesive structures to be described later with reference to FIGS. 1A to 4.

As a light source of an optical module (light emitting portion) 4 as described below, a can-packaged semiconductor laser 2 is provided, which is bonded to a laser holder 3 formed of metal or resin to fabricate an integrated optical module 4. The optical pickup case 1 is formed by die casting or molding with use of a material containing Zn (zinc), Mg (magnesium), Al (aluminum) or PPS (polyphenylene sulfide) as a principal component. As an adhesive material for bonding the optical module 4 to the optical pickup case 1 across (or through) a gap, an ultraviolet curing adhesive 9 is usually used for fixing. Namely, the optical module 4 is fixed to the optical pickup case 1 with the ultraviolet curing adhesive 9 for fixing on at least two positions (portions) between where an optical axis extending from the optical element (the semiconductor laser) 2 to the optical pickup case 1 is put. A layer of the ultraviolet curing adhesive 9 is formed between and in contact with each of the fixing surface of the optical module 4 and the side wall of the optical pickup case 1 opposed thereto. The layer of the ultraviolet curing adhesive is covered with an ultraviolet curing adhesive 11 different (different type) from the adhesive 9. Regarding the two kinds of ultraviolet curing adhesives as referred to herein, according to purposes of use, the ultraviolet curing adhesive 9 for fixing is designated a "first ultraviolet curing adhesive" and the ultraviolet curing adhesive 11 of a different kind is designated a "second ultraviolet curing adhesive", both being thus distinguished from each other. The second ultraviolet curing adhesive 11 covers at least a part of an exposed surface (a surface in contact with neither the contact surface 21 concerned nor the side wall 22 concerned) of the first ultraviolet curing adhesive 9 formed between the fixing surface 21 of the optical module 4 and the side wall 22 of the optical pickup case 1 and is in contact with the contact surface 21 and side wall 22 concerned. The second ultraviolet curing adhesive 11 is formed on the exposed surface of the first ultraviolet curing adhesive 9 while extending from the fixing surface 21 of the optical module 4 to the side wall 22 of the optical pickup case 1. The area where the first ultraviolet curing adhesive 9 and the second ultraviolet curing adhesive 11 are in contact with the optical module 4 is set for example so as to lie within the "fixing surface 21" and be spaced away from an end 23 of the fixing surface 21. By thus spacing the area of contact of the second ultraviolet curing adhesive 11 with the optical module 4 away from an end 23 of the fixing surface 21, the distance between the fixing surface 21 of the optical module 4 and the side wall 22 of the optical pickup case 1 opposed thereto is appropriately maintained by the action of (the layer of) the second ultraviolet curing adhesive 11 as a spacer.

On the other hand, at least a part of the space formed between the optical pickup case 1 (not limited to the above side wall 22, the cover 12 may be included) and the surface (not limited to the above fixing surface 21) of the optical module 4 opposed thereto is filled with a heat dissipating material 10 which is superior in thermal conductivity to the first and second ultraviolet curing adhesives 9, 11. The heat dissipating material 10 is filled into the space so as to avoid the portions where (the layers of) the first and second ultraviolet curing adhesives 9, 11 are formed and is in contact with the optical pickup case 1 and the optical module 4 which are opposed to each other. Namely, the heat dissipating material 10 is formed at at least a part of a space formed so as to be lain between the optical module 4 and the optical pickup case 1, and the first ultraviolet curing adhesive 9 and the second ultraviolet curing adhesive 11 are not existed at the part of the space. If the area where the fixing surface 21 of the optical module 4 and the side wall 22 of the optical pickup case 1 opposed thereto are in contact with the first ultraviolet curing adhesive 9 or the second ultraviolet curing adhesive 11 is designated an "adhesive surface", the heat dissipating material 10 contacts at least a part of the area exclusive of the "adhesive surface" for contacting the surface (not limited to the fixing surface 21) of the optical module 4 and the optical pickup case 1 (not limited to the side wall 22 concerned). When the heat generated in the optical module 4 can be discharged to the optical pickup case 1 by at least one of the first and second ultraviolet curing adhesives 9, 11 formed between the optical module 4 and the optical pickup case 1, the heat dissipating material 10 need not be filled into the aforesaid space.

The technique of fixing the optical module 4 to the optical pickup case 1 according to the present invention, which has been described above and will be explained below, is applicable not only to the optical module 4 but also to an adhesive portion where the optical module (detecting portion) 101 and other parts are fixed to the optical pickup case 1 formed using at least one of resin, metal and alloy, or an equivalent for the optical pickup case (e.g., housing or holding member). Even if the "parts" bonded to the optical pickup case 1 or its equivalent generate heat, the fixing technique according to the present invention keep the parts in an appropriate positional relation over a long period of time.

As the material of the first and second ultraviolet curing adhesives 9, 11, an acryl- or epoxy-based oligomer is employed, but an oligomer containing any other material as a principal component may also be used. A layer (or a lump) of the second ultraviolet curing adhesive 11 higher in hardness or elastic modulus than the layer of the first ultraviolet curing adhesive is formed between the optical module 4 and the optical pickup case 1. To attain such physical properties after curing, there may be used oligomers of different compositions for the first and second ultraviolet curing adhesives respectively. There also may be adopted a method wherein binders are formed using oligomers of the same composition and fillers are added thereto in different amounts to form the first and second ultraviolet curing adhesives 9, 11. In the latter case, for example, a acryl- or epoxy-based photo-curing adhesive (ultraviolet curing adhesive) is used as the binder and a silicon oxide is used as the filler. In the latter case, moreover, by using different adhesives (resins) as binders of the first and second ultraviolet curing adhesives 9, 11 and by adjusting the amount of the filler to be added, physical properties of the respective layers (lumps) may be optimized.

On the other hand, as the heat dissipating material 10, for example, there preferably is used a room temperature curing type resin using a silicone-based or another special polymer and adapted to cure in the presence of moisture contained in air, but it may be substituted by any other material. For example, the heat dissipating material 10 is preferably selected in accordance with a rise in temperature during operation of the optical module 4 or its equivalent. More specifically, as the heat dissipating material 10 there may be used resin which cures at the operating temperature, e.g., 70° C. or lower, of the optical module 4 or its equivalent. In FIGS. 1A to 1E and FIGS. 2, 3 and 4, there is shown a coordinate system of X-Y-Z for explaining a positional relation between the optical module 4 and the optical pickup case 1, but the X, Y and Z axes need not be orthogonal to one another insofar as they intersect one another. The Z axis in this coordinate system, like the z axis in the coordinate system shown in FIGS. 5A and 5B, represents the thickness direction of the optical pickup device 100. Therefore, the X-Y plane including X and Y axes is the same as the x-y plane described above, but X and x axes are not always coincident with each other and this is also true of Y and y axes. That is, in the coordinate system X-Y-Z, the foregoing "optical axis" extending from the optical module 4 (optical elements mounted thereon) to the optical pickup case 1 is defined to be Y axis and therefore the direction of X axis and that of Y axis change for each optical module 4.

First Embodiment

To explain a first embodiment of the present invention in detail, a description will be given below with reference to FIGS. 1A to 1E about a step of adjusting the position of the optical module 4 relative to the optical pickup case 1 and bonding the optical module 4 to the optical pickup case 1 in fabrication of the optical pickup device 100.

The optical module 4 has a structure wherein a semiconductor laser 2 of a so-called can structure with a light emitting element as a light source mounted on a sub-mount which overlies a stem is integrally fixed to a metallic holder 3 through an adhesive or the like. Before the step of adjusting the fixed position of the optical module 4 in the optical pickup case 1, a flexible printed circuit board 5 for the supply of an electric signal to the light emitting element (semiconductor laser 2) mounted on the optical module 4 is connected to terminals 7 of the semiconductor laser 2 with use of solder 6. The terminals 7 of the semiconductor laser 2 are positioned on the surface other than the "fixing surface 21".

Figure 1A:
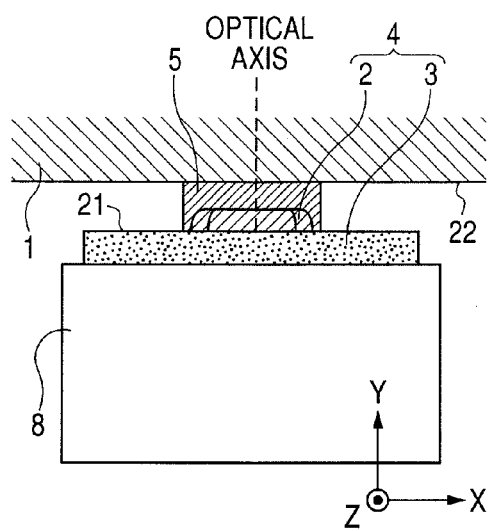
FIGS. 1A to 1D are diagrams explanatory of an optical module adjusting step and a step of bonding the optical module to an optical pickup case in a manufacturing process for an optical pickup device according to the present invention.

A description is first made of the optical pickup adjusting step with reference to FIG. 1A. First, the holder 3 portion of the optical module 4 is chucked by a jig 8 and a positional adjustment is made with a high accuracy while operating the semiconductor laser 2 and thereby causing the optical module 4 to shift in a three-dimensional manner (in X, Y and Z directions) with respect to the optical pickup case 1. After the positional adjustment of the optical module 4, for the application of the first ultraviolet curing adhesive 9, the jig 8 is adjusted with a micrometer or the like temporarily in the optical axis direction (Y direction) with respect to the coordinates referred to above in the three-dimensional alignment, thereby keeping the optical module 4 (fixing surface) and the optical pickup case 1 (side wall) spaced a predetermined distance from each other.

Figure 1B:
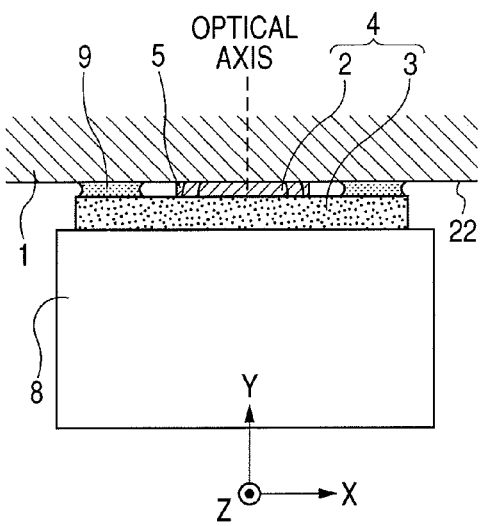
Figure 1C:
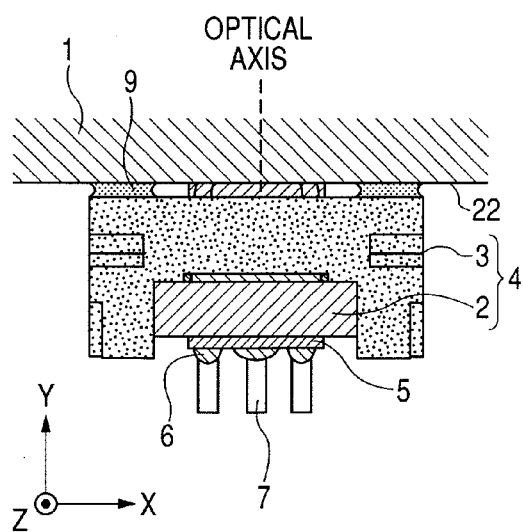

Next, the first ultraviolet curing adhesive 9 is applied on at least two positions (portions) between where the optical axis of the optical element is put by using a dispenser and the position of the optical module 4 is again finely adjusted in a three-dimensional manner. As shown in FIG. 1B, at a position where an optical coupling between the semiconductor laser 2 mounted on the optical module 4 and an optical system provided in the optical pickup case 1 becomes optimum, the optical module 4 emits ultraviolet light to the first ultraviolet curing adhesive 9 to bond and fix the optical module 4 (fixing surface) to the optical pickup case 1 (side wall). Next, the chucking by the jig 8 is released (FIG. 1C). At this time, if an excess stress is imposed on the optical module 4, the position thereof relative to the optical pickup case 1 is deviated and a large optical axis offset may result between the optical module 4 (the light emitting portion of the semiconductor laser 2) and the optical pickup case 1 (optical system). Moreover, with reduction in thickness and higher function of the optical pickup device 100, the flexible printed circuit board 5 extended to the optical module 4 from the optical pickup case 1 (e.g., an electronic circuit mounted thereon) is bent at a large curvature and, since a multi-layer interconnection is formed thereon, the rigidity thereof is enhanced. A large stress is imposed on the flexible printed circuit board 5 thus extended and connected electrically to the optical module 4 (semiconductor laser 2) and this stress increases the bonding stress imposed on the bonding interface between the optical module 4 (fixing surface) and the optical pickup case 1 (side wall). Further, in the optical pickup device 100, since the shape of the flexible printed circuit board 5 differs for each of the optical modules 4 and 101, there occur stresses in every direction of the optical pickup case 1. Therefore, it is preferable that the hardness and elastic modulus of the first ultraviolet curing adhesive 9 for fixing the optical module 4 to the optical pickup case 1 be high.

Figure 1D:
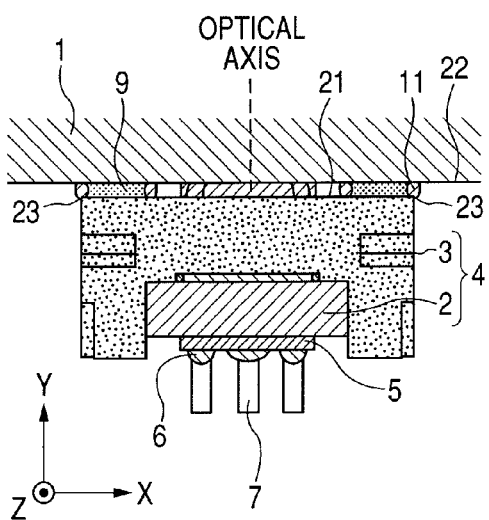

Next, as shown in FIG. 1D, with use of a dispenser, the second ultraviolet curing adhesive 11 is applied so as to cover around the first ultraviolet curing adhesive 9. Thereafter, the second ultraviolet curing adhesive 11 is cured by irradiation with ultraviolet light. The second ultraviolet curing adhesive 11 produces a force when curing and therefore it is preferable that an adhesive small in cure shrinkage be used as the second ultraviolet curing adhesive 11.

Generally, in the case of an adhesive which is soft and small in elastic modulus, the amount of filler contained therein is also small, so that such an adhesive is low not only in its viscosity but also in thixotropy. If such a resin is applied to the space between the optical module 4 (fixing surface) and the optical pickup case 1 (side wall), the resin will drop from its applied position before being irradiated with ultraviolet light. Thus, there occur large variations in fillet shape of the adhesive formed in that space. As a result, there occurs an unbalanced heat shrinkage of (the layer of) the adhesive which is heated by operation of the optical module 4 and there is a fear that the fixing surface of the optical module 4 may be dislocated toward one end of the side face of the optical pickup case 1. Further, in the case of a soft adhesive of a small elastic modulus, the monomer component and photoinitiator contained in the adhesive are apt to be decomposed when heated to a high temperature. If such an adhesive is applied to around the first ultraviolet curing adhesive 9, the same bad influence as that of the heat dissipating material is exerted on the first ultraviolet curing adhesive 9.

An adhesive which is hard or high in elastic modulus is characteristic in that its viscosity is very high and the adhesive itself scarcely decomposes in comparison with the soft adhesive. Therefore, by controlling the pressure and time in the dispenser used, such an adhesive can be applied to a predetermined position in the foregoing space and variations in fillet shape of the adhesive formed in the said space are very small. Consequently, the influence of heat shrinkage of the adhesive on the bonded structure of the optical module 4 (fixing surface 21) and the optical pickup case 1 (side face 22) is very small. Besides, after curing, the adhesive in question becomes very hard and is little deformed. Thus, the deformation of the optical module 4 heated to a high temperature by operation thereof is also suppressed.

Thus, in order to suppress an external influence on the bonded structure of the optical module 4 and the optical pickup case 1 and maintain the positional stability thereof, it is preferable that at least one of hardness and elastic modulus of the second ultraviolet curing adhesive 11 be made higher than that of the first ultraviolet curing adhesive 9. Further, it is preferable that the water absorption of the first ultraviolet curing adhesive 9 and that of the second ultraviolet curing adhesive 11 be made as small as possible.

One guideline for selecting optimum first and second ultraviolet curing adhesives 9, 11 is shown as follows in terms of respective physical properties. Preferably, the first ultraviolet curing adhesive 9, after curing thereof and at room temperature (25° C.), has a hardness of 80 or more in Shore D or 20 or more in Vickers hardness or an elastic modulus of 2.5 GPa or more, and at an operating temperature (e.g., 70° C.) of the optical module 4, has a hardness of 65 or more in Shore D or 10 or more in Vickers hardness or an elastic modulus of 500 MPa or more. The hardness designated Shore D (Shore Hardness D) is determined using a type D durometer in accordance with JIS K 6253 or ISO 7619, while Vickers hardness is determined in accordance with JIS Z 2244 or ISO 6507-1. In the bonded structure described above, since the second ultraviolet curing adhesive 11 is hard and high in elastic modulus, the adhesive strength based thereon tends to be low. The second ultraviolet curing adhesive is less effective in reinforcing the adhesive strength than a soft adhesive, but this fact prevents any external influence on the adhesive layer and makes it difficult to exert a bad influence on the first ultraviolet curing adhesive 9. Thus, the second ultraviolet curing adhesive is very effective from the standpoint of accuracy for maintaining the bonded structure in question. Further, a lowering in adhesive force of the first ultraviolet curing adhesive due to an external environment is suppressed by the second ultraviolet curing adhesive 11. It is preferable that the second ultraviolet curing adhesive 11 be higher in glass transition temperature than the first ultraviolet curing adhesive 9 and that the amount of filler contained therein be larger than that contained in the first ultraviolet curing adhesive.

Figure 1E:
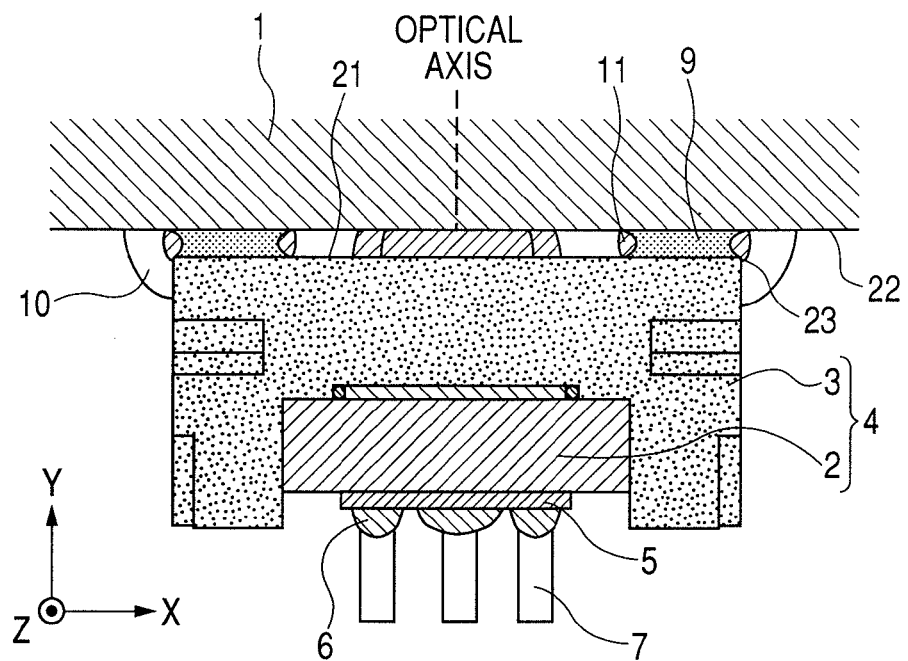
FIG. 1E is an explanatory diagram showing a first embodiment of the optical pickup case with the optical module bonded thereto after performing the steps shown in FIGS. 1A to 1D.

Next, as shown in FIG. 1E, the heat dissipating material 10 superior in thermal conductivity is filled between the optical pickup case 1 and the optical module 4. This resin is, for example, a room temperature curing type resin superior in thermal conductivity, but is very low in adhesive strength and is therefore utilized as a heat discharge path for preventing heat from being confined to the optical module 4. Since the heat dissipating material 10 is a room temperature curing resin, at least several hours are required for curing of the resin. The heat dissipating material 10 may be filled not only between the optical pickup case 1 and the optical module 4 but also between the optical module 4 and the optical pickup cover 12 (a part of the optical pickup case in a broad sense) as shown in FIG. 2, thereby allowing the heat generated from the optical module 4 to escape to the whole of the optical pickup case 1.

Figure 2:
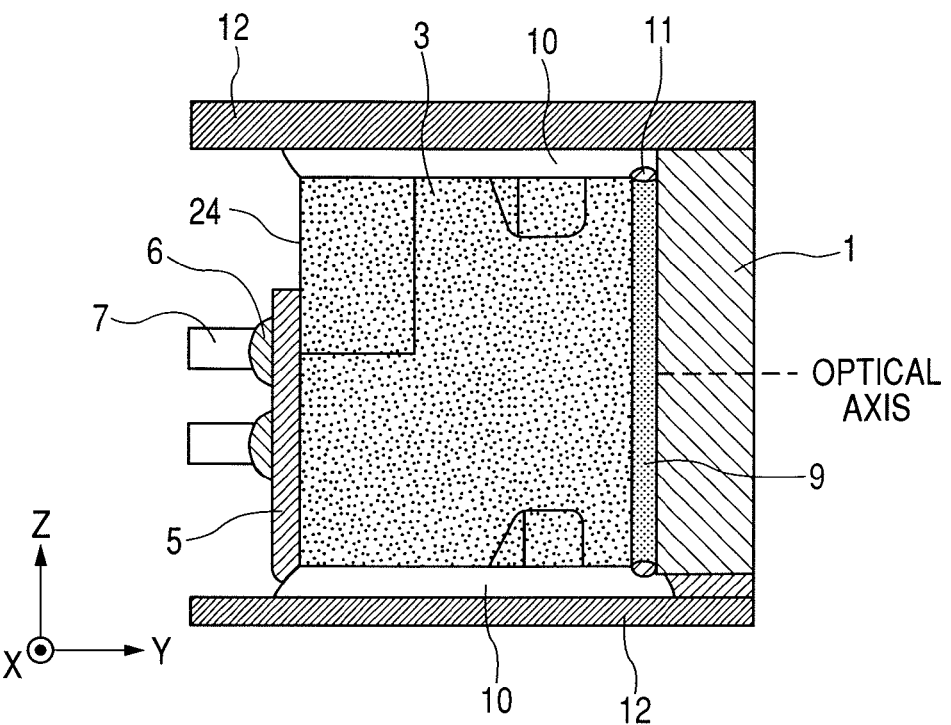
FIG. 2 is a sectional view of a bonded structure of the optical pickup case and the optical module shown in FIG. 1E taken in a thickness direction (Z axis) of an optical pickup device.
Figure 3:
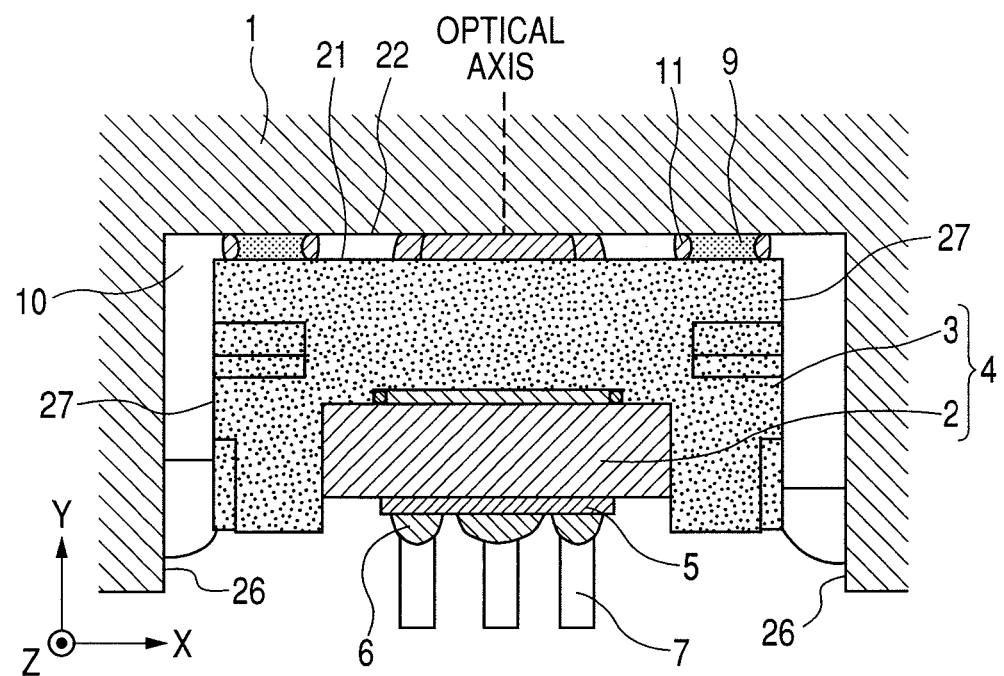
FIG. 3 is an explanatory diagram showing a second embodiment of the present invention.
Figure 4:
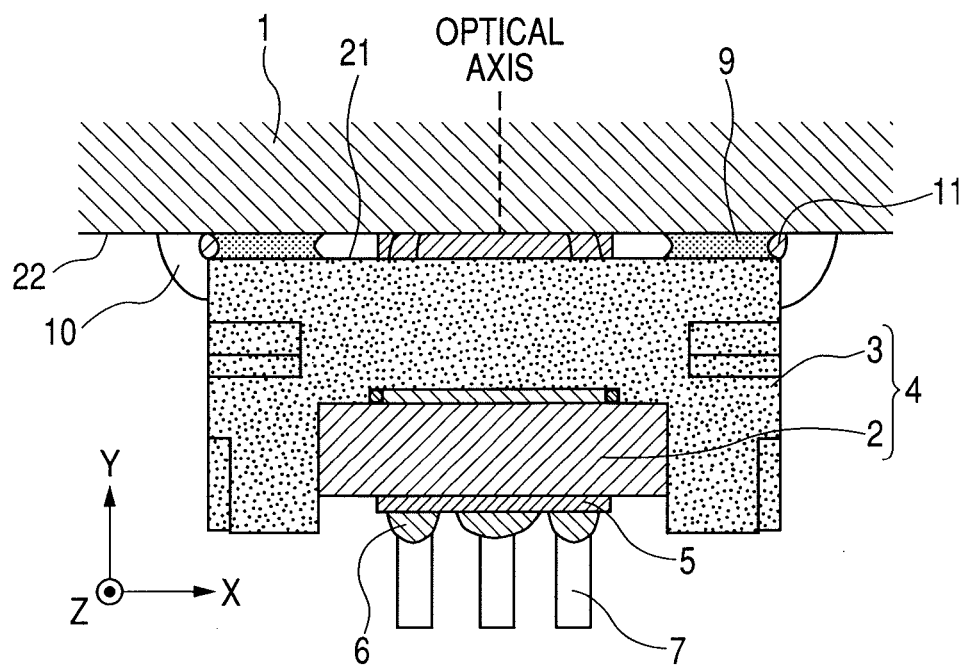
FIG. 4 is an explanatory diagram showing a third embodiment of the present invention.

FIG. 2 is a sectional view of the bonded structure of the optical pickup case 1 and the optical module 4 taken in the thickness direction (Z axis) of the optical pickup device 100. Pairs of bonded structures (see FIG. 1E) each comprising the first and second ultraviolet curing adhesives 9, 11 are arranged side by side in X axis direction with an optical axis therebetween. In FIG. 2, one of the pairs is described in an extending state in Z axis direction. As shown in FIG. 1E and FIGS. 3 and 4 which will be referred to in embodiments to be described later, the pair of bonded structures are formed respectively on both sides of an "optical axis" which is drawn in phantom from the optical module 4 (an optical element such as the semiconductor laser 2 mounted thereon) toward the optical pickup case 1. The foregoing "fixing surface 21" in the optical module 4 is also defined as a surface intersecting the "optical axis". In the fixing surface 21, the juxtaposition direction of the pair of bonded structures is not limited to the above X axis direction, but may be a direction (e.g., Z axis) which intersects the X axis direction on X-Z plane. Moreover, in the fixing surface 21, the pair of bonded structures need not always be arranged symmetrically with respect to the point of intersection between the fixing surface and the above "optical axis". Even if the limitation on the layout of the paired bonded structures is thus eased, the optical module 4 is fixed stably to a desired position with respect to the optical pickup case 1 as long as the paired bonded structures are formed between the optical pickup case 1 and the optical module 4.

In FIG. 2, the flexible printed circuit board 5 is drawn out along one (lower surface) of surfaces in contact with the fixing surface 21 of the optical module 4 from between the optical pickup case 1 and the cover 12 connected to the lower surface of the optical pickup case and is connected electrically to the terminals 7 of the semiconductor laser 2 which projects from the surface 24 opposite to the fixing surface 21 of the optical module 4. The heat dissipating material 10 is filled into the space formed between the lower surface of the optical module 4 and the cover 12 in such a manner that the flexible printed circuit board 5 is embedded therein.

Second Embodiment

Next, a second embodiment of an optical pickup device according to the present invention will now be described with reference to FIG. 3.

FIG. 3 shows the second embodiment of the optical pickup device according to the present invention, in which side walls 26 of an optical pickup case 1 are opposed to both sides 27 of an optical module 4. The optical module 4 is opposed to side walls of the optical pickup case 1 at its fixing surface (the surface on which adhesive surfaces of first and second ultraviolet curing adhesives 9, 11 are formed on both sides of an optical axis) 21 and other two surfaces 27 in contact with the fixing surface at both ends of the fixing surface 21. In this second embodiment, the heat dissipating material 10 is filled not only into the space formed between the fixing surface 21 of the optical module 4 and the side wall 22 of the optical pickup case 1 opposed thereto but also into the spaces formed between the other two surfaces 27 in contact with the fixing surface 21 of the optical module 4 and the side walls (other side walls) 26 of the optical pickup case 1 opposed thereto, thereby enhancing the heat dissipating performance of the optical module 4. In the case where it is difficult to apply the second ultraviolet curing adhesive 11 to the fixing surface of the optical module 4 because both sides 27 of the fixing surface are enclosed with side walls 26 of the optical pickup case 1, the first ultraviolet curing adhesive 9 may be applied to a light emitting point side of the optical module 4 to facilitate application of the second ultraviolet curing adhesive 11.

Third Embodiment

Next, a third embodiment of an optical pickup device according to the present invention will now be described with reference to FIG. 4.

FIG. 4 shows the third embodiment of the optical pickup device according to the present invention. The illustrated structure is effective in the case where the spacing for bonding is narrow and the second ultraviolet curing adhesive 11 is difficult to enter between the fixing surface 21 of the optical module 4 and the side wall 22 of the optical pickup case 1 opposed thereto. According to this structure, not the whole but only a part of the exposed surface of the first ultraviolet curing adhesive 9 is coated with the second ultraviolet curing adhesive 11. The higher the proportion of covering of the exposed portion with the second ultraviolet curing adhesive 11 (the larger the surface area of the coated portion), the more suppressed the external influence on the first ultraviolet curing adhesive 9. However, in the structure of this embodiment wherein the fixing surface of the optical module 4 and the side wall of the optical pickup case 1 opposed thereto are very close to each other, even by merely covering a part of the exposed surface of the first ultraviolet curing adhesive 9 with the second ultraviolet curing adhesive 11 it is possible to prevent the influence of the external environment on the first ultraviolet curing adhesive 9. For example, if the portion of the first ultraviolet curing adhesive 9 which is exposed toward an end of the mounting surface of the optical module 4 is covered with the second ultraviolet curing adhesive 11, the area (space) located inside the fixing surface (the optical axis side) with respect to the applied portion of the second ultraviolet curing adhesive 11 is substantially sealed by the applied second ultraviolet curing adhesive 11.

With the recent reduction in size and thickness of optical pickup devices, there now exists a demand for high-speed recording onto optical recording media such as DVDs of various standards, as well as Blu-ray disc corresponding to a blue color semiconductor laser and HD-DVD. As a result of an optical disc drive being constructed so as to permit high-speed recording, the amount of heat generated from an optical module in an optical pickup device installed in the optical disc drive increases; besides, the tolerable quantity of heat dissipation for the optical pickup device itself is becoming more strict. Consequently, it is essential for the optical module to have a bonded structure of high reliability which ensures a high position maintaining accuracy while ensuring a heat dissipating performance. Therefore, a demand exists for a technique of bonding and fixing an optical module to an optical pickup device body (a case which constitutes the device body) which technique is not only able to ensure heat dissipating performance of the optical pickup device itself but also able to diminish an optical axis offset caused by a long-term deformation of a thick adhesive layer for fixing the optical module to the optical pickup device body even if stress induced by a flexible printed circuit board connected to the optical module is imposed on the thick adhesive layer. The technique according to the present invention is an important technique able to satisfy such a demand for the optical pickup device and improve both reliability and quality.

The invention may be embodied in other specific forms without departing from the spirit or essential characteristics thereof. The present embodiment is therefore to be considered in all respects as illustrative and not restrictive, the scope of the invention and all changes which come within the meaning and range of equivalency of the claims are therefore intended to be embraced therein.

What is claimed is:

1. An optical pickup device comprising:
at least one optical module having an optical element; and
an optical pickup case with the optical module bonded and fixed to the optical pickup case through a gap,
wherein:
the optical module is fixed to the optical pickup case by a first ultraviolet curing adhesive at at least two positions with an optical axis placed between the positions, the optical axis extending from the optical element to the optical pickup case; and
at least a part of a surface of the first ultraviolet curing adhesive exposed between the optical module and the optical pickup case is covered with a second ultraviolet curing adhesive higher in hardness or elastic modulus than the first ultraviolet curing adhesive.

2. The optical pickup device according to claim 1,
wherein a heat dissipating material higher in thermal conductivity than the first and second ultraviolet curing adhesives is provided so as to be in contact with both the optical module and the optical pickup case.

3. The optical pickup device according to claim 2,
wherein the heat dissipating material is formed at at least a part of a space formed between the optical module and the optical pickup case, and the first and the second ultraviolet curing adhesive are not formed at the part of the space.

4. The optical pickup device according to claim 3,
wherein the heat dissipating material is a room temperature curing resin adapted to cure in the presence of moisture contained air.

5. The optical pickup device according to claim 2,
wherein the heat dissipating material is a room temperature curing resin adapted to cure in the presence of moisture contained air.

6. An optical disc drive including the optical pickup device described in claim 2.

7. The optical pickup device according to claim 1,
wherein the optical module has a first surface opposed to the optical pickup case and intersecting the optical axis, and the first and second ultraviolet curing adhesives are in contact with the first surface and a surface of the optical pickup case, the surface of the optical pickup case being opposed to the first surface.

8. The optical pickup device according to claim 7,
wherein the first ultraviolet curing adhesive is in contact with a portion spaced away from an end of the first surface of the optical module.

9. The optical pickup device according to claim 7,
wherein the second ultraviolet curing adhesive covers a surface of the first ultraviolet curing adhesive exposed toward an end of the first surface.

10. The optical pickup device according to claim 7,
wherein:
the optical module has at least one second surface, the second surface being in contact at one side thereof with the first surface and spreading in a direction intersecting the first surface; and
a heat dissipating material higher in thermal conductivity than the first and second ultraviolet curing adhesives is provided at at least a part of a space formed between the second surface and a surface of the optical pickup case, the surface of the optical pickup case being opposed to the second surface, the heat dissipating material being provided so as to be in contact with both the second surface of the optical module and the surface of the optical pickup case.

11. An optical disc drive including the optical pickup device described in claim 10.

12. The optical pickup device according to claim 7,
wherein a terminal of the optical element is provided on a surface different from the first surface of said optical module; and
a flexible printed circuit board having one end connected electrically to the terminal is drawn out from the optical pickup case.

13. An optical disc drive including the optical pickup device described in claim 7.

14. The optical pickup device according to claim 1,
wherein the second ultraviolet curing adhesive has a glass transition temperature higher than that of the first ultraviolet curing adhesive.

15. The optical pickup device according to claim 1,
wherein the second ultraviolet curing adhesive contains a larger amount of filler than in the first ultraviolet curing adhesive.

16. An optical disc drive including the optical pickup device described in claim 1.

* * * * *